Sept. 9, 1969   T. G. ZABALBEITIA   3,465,853
ELECTRIC BRAKES

Filed May 10, 1967   2 Sheets-Sheet 1

INVENTOR
TELESFORO GOROSTIZA ZABALBEITIA
BY
*Ernest G. Montague*

ATTORNEY.

Sept. 9, 1969   T. G. ZABALBEITIA   3,465,853
ELECTRIC BRAKES
Filed May 10, 1967   2 Sheets-Sheet 2
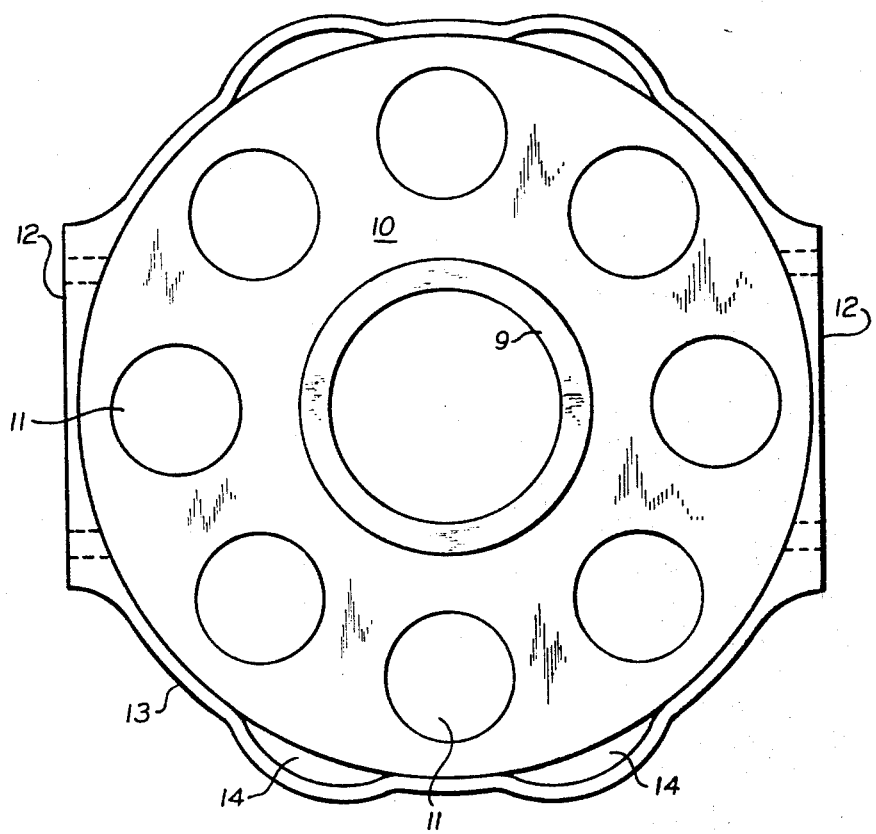
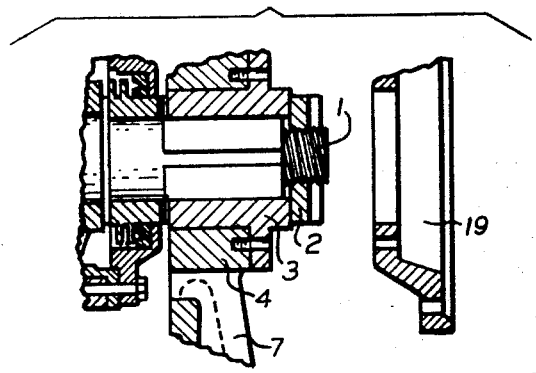
INVENTOR
TELESFORO GOROSTIZA ZABALBEITIA
BY
ATTORNEY.

United States Patent Office 3,465,853
Patented Sept. 9, 1969

3,465,853
ELECTRIC BRAKES
Telesforo G. Zabalbeitia, Dr. Areilza 44, Bilbao, Spain
Filed May 10, 1967, Ser. No. 637,529
Claims priority, application Spain, Sept. 21, 1966,
331,462
Int. Cl. B60l *7/00;* B60t *1/06;* F16d *65/84*
U.S. Cl. 188—163                      5 Claims

ABSTRACT OF THE DISCLOSURE

An electric brake comprising two pan shaped end members each operatively connected at the respective ends of the brake axle. Each member includes an inwardly directed annular rim disposed against the outer face of a radially extending flange of a coupling sleeve mounted on the brake axle. The hub of the brake disc is disposed on the inner face of the flange and all members are connected by a bolt means passing therethrough.

---

The present invention relates to electric brakes, in general, and to an electric brake system design, structure and assembly to permit a smooth, safe and effective operation, in particular.

The adaptation of the electric brakes mounted on motor vehicles requires changes in the transmission axle providing traction to the rear wheels, and it is also required to interpose in such an axle, coupling sleeves and ball bearings for mounting the electric motor. This adaptation represents a substantial increase in installation cost and also requires a perfect alignment. Ball bearing overheating also constitutes a very significant problem.

It is one object of the present invention to provide an improved electric brake.

It is another object of the present invention to provide an electric brake incorporating at both ends of the braking axle one piece, having the shape of an annular pan member which member is held by corresponding nuts screwed to the axle, each one of the pans has an inner peripheral rim on which corresponding coupling sleeves are placed and affixed to the assembly by screws passing therethrough. The cup members are disposed between the coupling sleeves and the braking plates.

As a consequence of this special arrangement, the coupling sleeves can easily be changed and substituted, in each case, by sleeves adapted to the characteristics of the vehicle axle, and it is not necessary to disassemble the whole braking system, since it is integrally mounted on the corresponding axle and the entire integral mechanism is incorporated on the axle and held by nuts tightened at its ends.

It is yet another object of the present invention to provide an electric brake wherein the braking disc is greatly improved by providing it with two sets of cooling fins of special characteristics which are joined together at the outer part by a ring. One of the fin sets serves at the same time as a reinforcing rib, which arrangement considerably increases the mechanical strength of the braking disc.

It is still another object of the present invention to provide an electric brake having an arrangement within the braking mechanism of two pieces, each shaped as a cup, and inserted on the main axle and containing sliding ball bearings, about which is mounted the tubular cylindric shank which constitutes the basic body or frame on which the entire braking system is disposed.

It is yet still another object of the present invention to provide an electric brake with an arrangement of a frame with a special design and characteristics having equidistantly spaced openings, formed in a circular manner in which the terminal pieces are installed. The frame is encircled at its periphery by a rim forming vents passing therethrough on which the pieces or cable terminal boxes are installed. By this arrangement, sufficient space and easy access is provided for the cable terminal boxes.

With these and other objects in view which will become apparent in the following description, the present invention will be clearly understood in connection with the accompanying drawings, in which:

FIG. 2 is a sectional view of the frame on which the terminal pieces are installed;

FIG. 4 is a fragmentary cross-sectional view of the sleeve assembly which does not require the dismounting of the general assembly of the brake.

Figure 1:
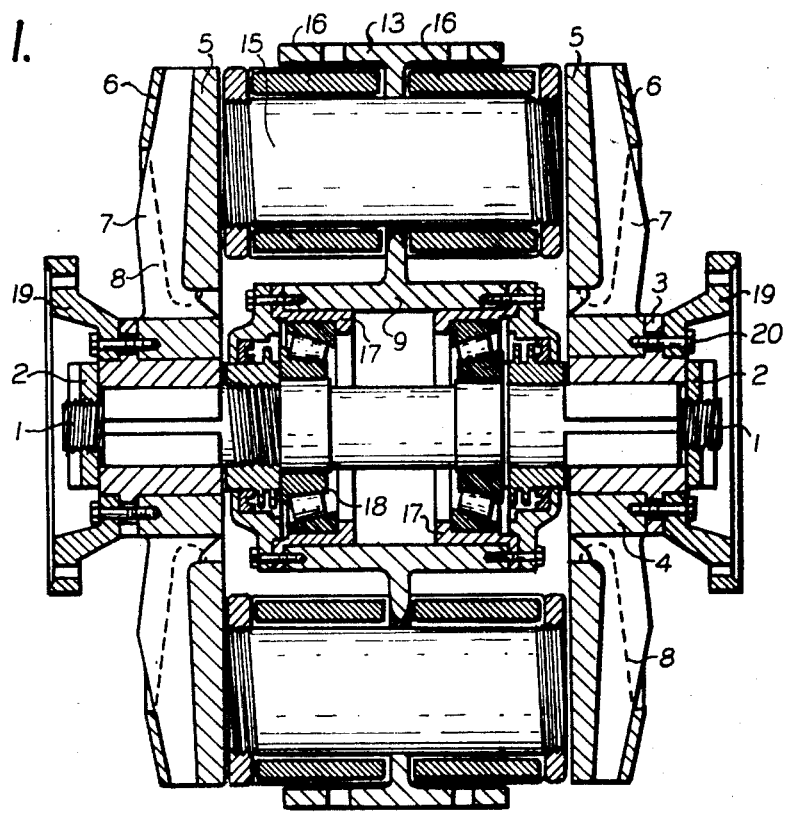
FIGURE 1 is an axial cross-section of the improved electric brake in accordance with the present invention.
Figure 3:
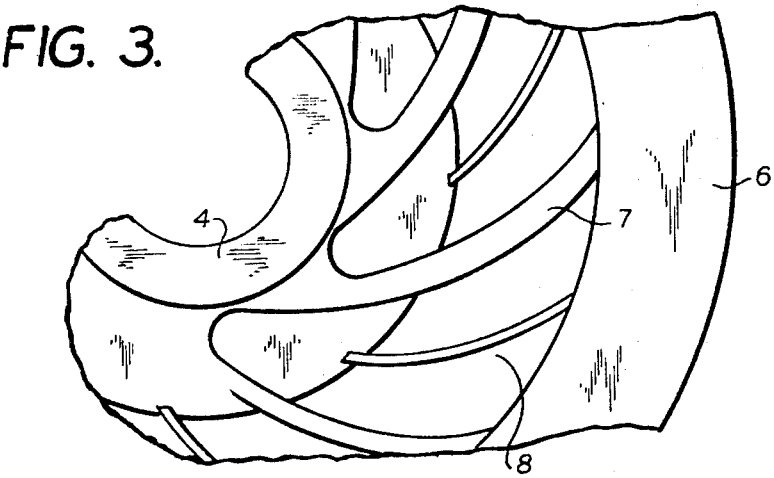
FIG. 3 is a fragmentary view of the braking disc provided with cooling fins.

Referring now to the drawings, and more particularly to FIGS. 1 and 4, a brake axle 1 is provided about which are mounted two cylindrical coupling sleeves 3, one at each end of the brake axle. The coupling sleeves 3 are held thereon by bolts 2 screwed at the ends of the brake axle. Each coupling sleeve 3 is formed with a radially extending flange between its ends having openings through which bolts or screws 20 secure an annular cup- or pan-shaped end member 19 and a cylindrical hub 4 of a brake disc 5, respectively, thereto, thereby operatively coupling the end member 19 to the brake disc 5.

The end member 19 is formed with an inwardly directed annular portion which complementarily abuts the outwardly facing side of the radially extending flange of the coupling sleeve 3. The cylindrical hub 4 of the brake disc 5 is disposed about the coupling sleeve 3 abutting the inwardly facing side of the radially extending flange of the coupling sleeve 3. The bolt 20 passes through the end member 19, the radially extending flange of the coupling sleeve 3, and the hub 4 of the brake disc 5, in that order, in which hub it is screwed, thereby securing these members together.

The brake discs 5 have a plurality of wide cooling fins 7 on the outer side which simultaneously act as reinforcing ribs to increase the mechanical strength of the brake discs. Another set of fins 8 complete the cooling systems of the brake discs. Both sets of cooling fins are connected by an outer ring 6 on the outwardly directed side of the brake discs.

The electric brake means assembly is mounted on a central cylindrical hub or shank 9 which serves as the main brake frame. The hub 9 is connected at its ends to two spaced annular pan-shaped inner members 17. The pan-shaped inner members 17 are centrally disposed about the brake axle 1 by ball bearings 18, rotatably free relative the axle 1. The hub 9 is secured to the inner member 17 by bolts or the like.

A central partition wall 10 (FIG. 2) extends centrally outwardly from the hub 9 to which it is integrally connected. The central partition wall 10 of the main brake frame extends, supporting on both of its sides a series of brake terminal pieces 15 which are disposed in slots 11 formed in the frame, constituting the electric brake means which also includes the brake frame. Coils 16 are provided about the brake terminal pieces 15 for initiating a braking operation in cooperation with the brake discs 5.

The main brake frame is surrounded by a rim 13 of the partition wall 10 forming terminals 12 (FIG. 2) which are adapted to be attached to the frame of the vehicle (not shown). Accordingly the electric brake means is operatively attached to the frame of the vehicle. Vents are formed which pass through the terminal 12 which permit the easy placement of cable terminal boxes (not shown).

The pan-shaped inner members 17, mounted on the ball bearings 18, and connected to the ends of the central hub or shank 9 of the frame in the interior of the hub constitute the operative connection of the electric brake means on the axle as well as in general being a part of the brake means itself.

The coupling sleeves can be readily replaced since they are held to the assembly by the screws 20, which retention is obtained with perfect independence from the electric brake means assembly.

I claim:
1. An electric brake comprising
   a brake axle,
   a cylindrical coupling sleeve coaxially disposed on said brake axle at each end thereof,
   a nut on said brake axle at each end thereof securing said coupling sleeve thereon,
   said coupling sleeve including between its ends a radially extending flange having outwardly and inwardly facing sides,
   an annular brake disc having a central annular hub, the latter mounted about said coupling sleeve and abutting the inwardly facing side of said radially extending flange,
   an annular pan shaped end member mounted about said annular hub and abutting the outwardly facing side of said radially extending flange, and
   bolt means passing through said end member, said radially extending flange, and said annular hub for releasably securing said end member and said brake disc to said coupling sleeve.

2. The electric brake, as set forth in claim 1, further comprising
   electric brake means for cooperating with said brake disc for effecting braking,
   said electric brake means is operatively disposed about said brake axle between both of said coupling sleeves independently of the remainder of said electric brake, said coupling sleeves thereby being operatively mounted and dismounted on said brake disc independently from said electric brake means.

3. The electric brake, as set forth in claim 2, further comprising
   supporting means for suspending said electric brake means on said brake axle, and
   said supporting means comprises,
   two annular pan shaped inner members each rotatably disposed spaced from each other about said brake axle and operatively secured to said electric brake means, and
   ball bearings disposed between said inner members and said brake axle rotatably mounting said inner members on said brake axle.

4. The electric brake, as set forth in claim 1, wherein said brake disc comprises,
   an outer ring,
   a first and second set of spaced alternating cooling fins disposed between said annular hub and said outer ring, and
   said first set of cooling fins constituting reinforcing ribs increasing the mechanical strength of said brake disc.

5. The electric brake, as set forth in claim 3, further comprising
   a main brake frame comprising,
   a cylindrical shank secured to said two annular pan shaped inner members,
   a central frame integrally extending radially from the center of said cylindrical shank and having a plurality of circumferentially arranged openings therethrough,
   a rim integrally surrounding said central frame and defining terminals, and vents therein,
   said terminals adapted to be attached to the frame of a vehicle,
   said vents being adapted for terminal cable boxes,
   brake terminal pieces disposed in said plurality of circumferential openings, and
   coils operatively wound about said brake terminal pieces.

References Cited

UNITED STATES PATENTS

| | | | |
|---|---|---|---|
| 575,789 | 1/1897 | Case | 188—164 |
| 1,246,831 | 11/1917 | Adsit | 188—164 |
| 2,549,217 | 4/1951 | Mason | 188—164 X |

FOREIGN PATENTS

| | | |
|---|---|---|
| 825,044 | 12/1959 | Great Britain. |
| 532,857 | 9/1955 | Italy. |

DUANE A. REGER, Primary Examiner

U.S. Cl. X.R.
188—18, 264